April 27, 1954    E. J. SCHAAF ET AL    2,676,450
CORN HARVESTING MACHINE
Filed Jan. 4, 1950      5 Sheets-Sheet 2
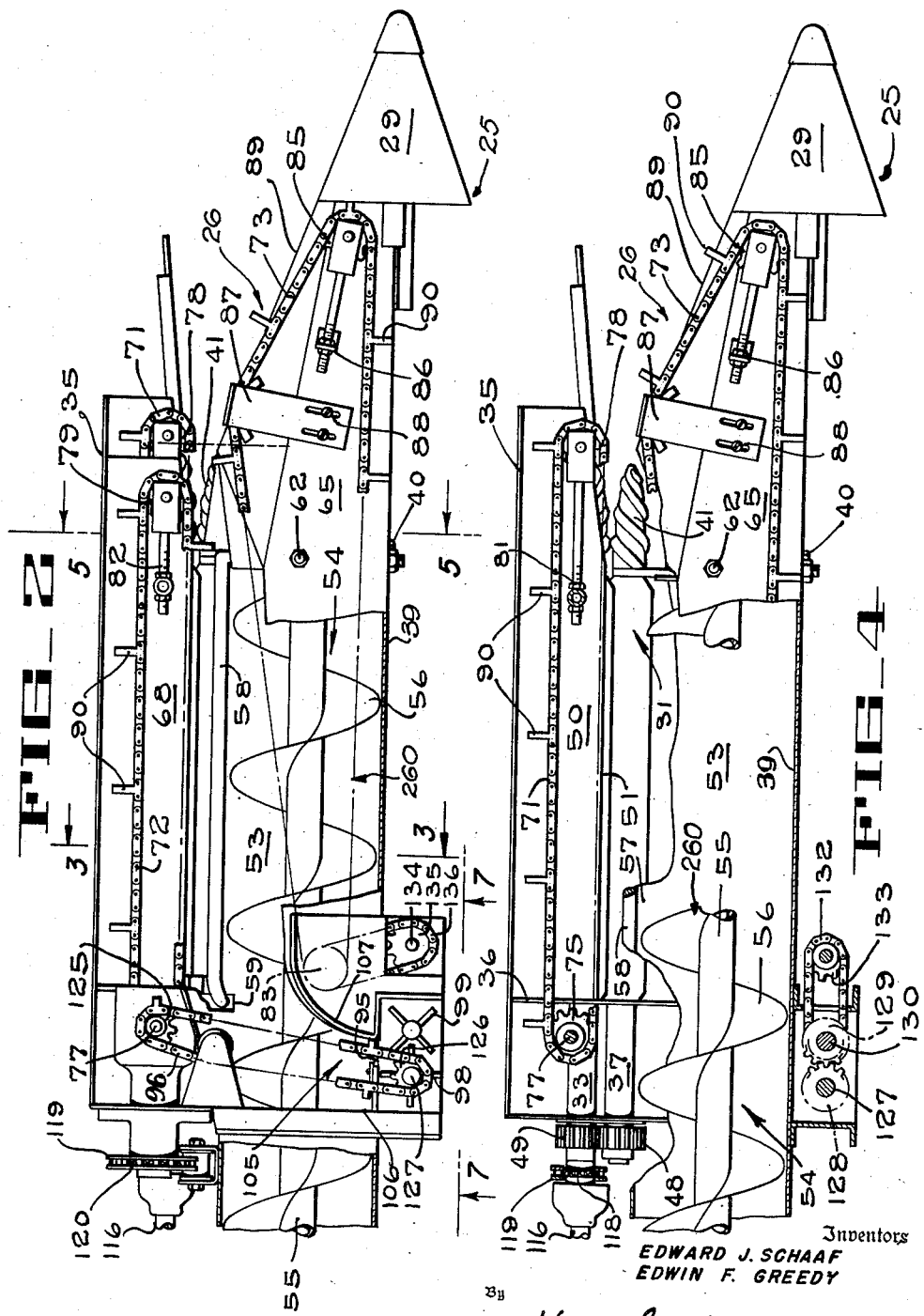
Inventors
EDWARD J. SCHAAF
EDWIN F. GREEDY
By Hans G. Hoffmeister
Attorney

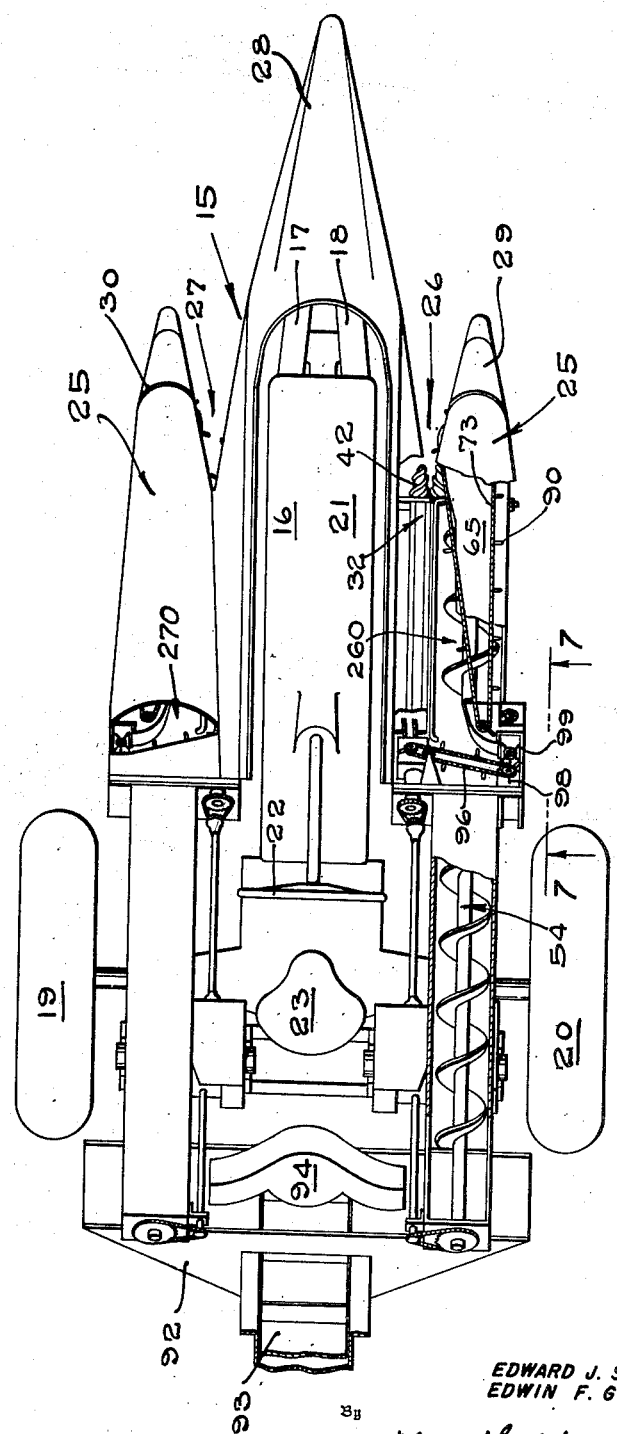

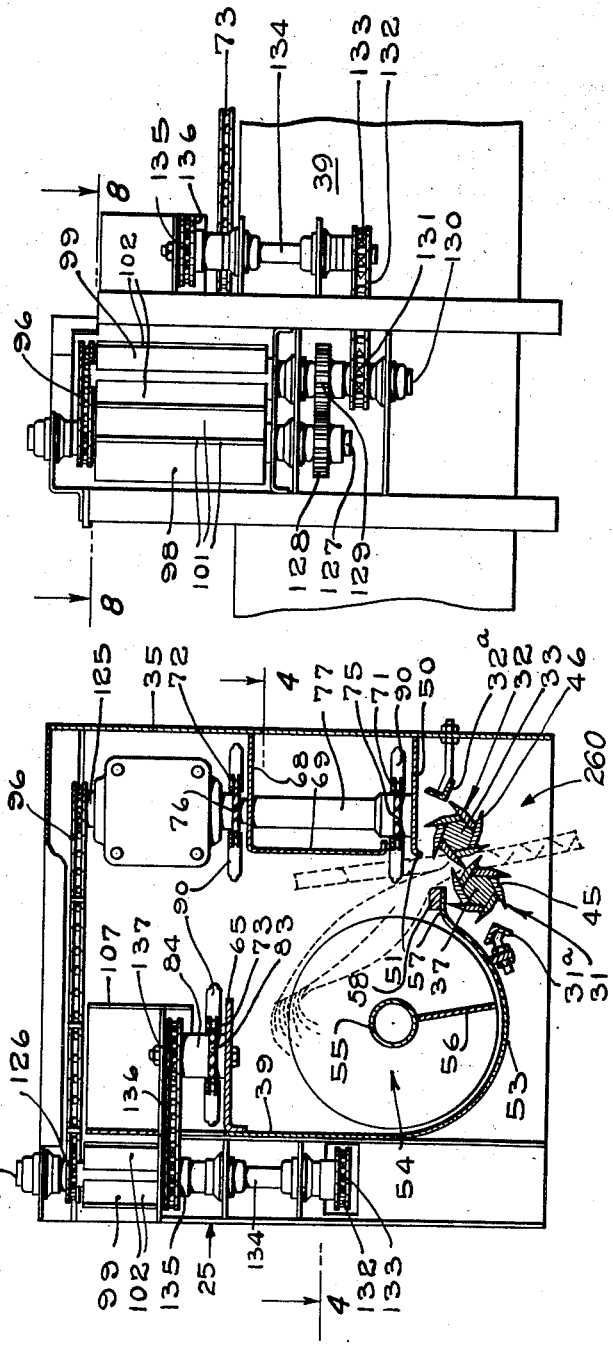
Inventors
EDWARD J. SCHAAF
EDWIN F. GREEDY

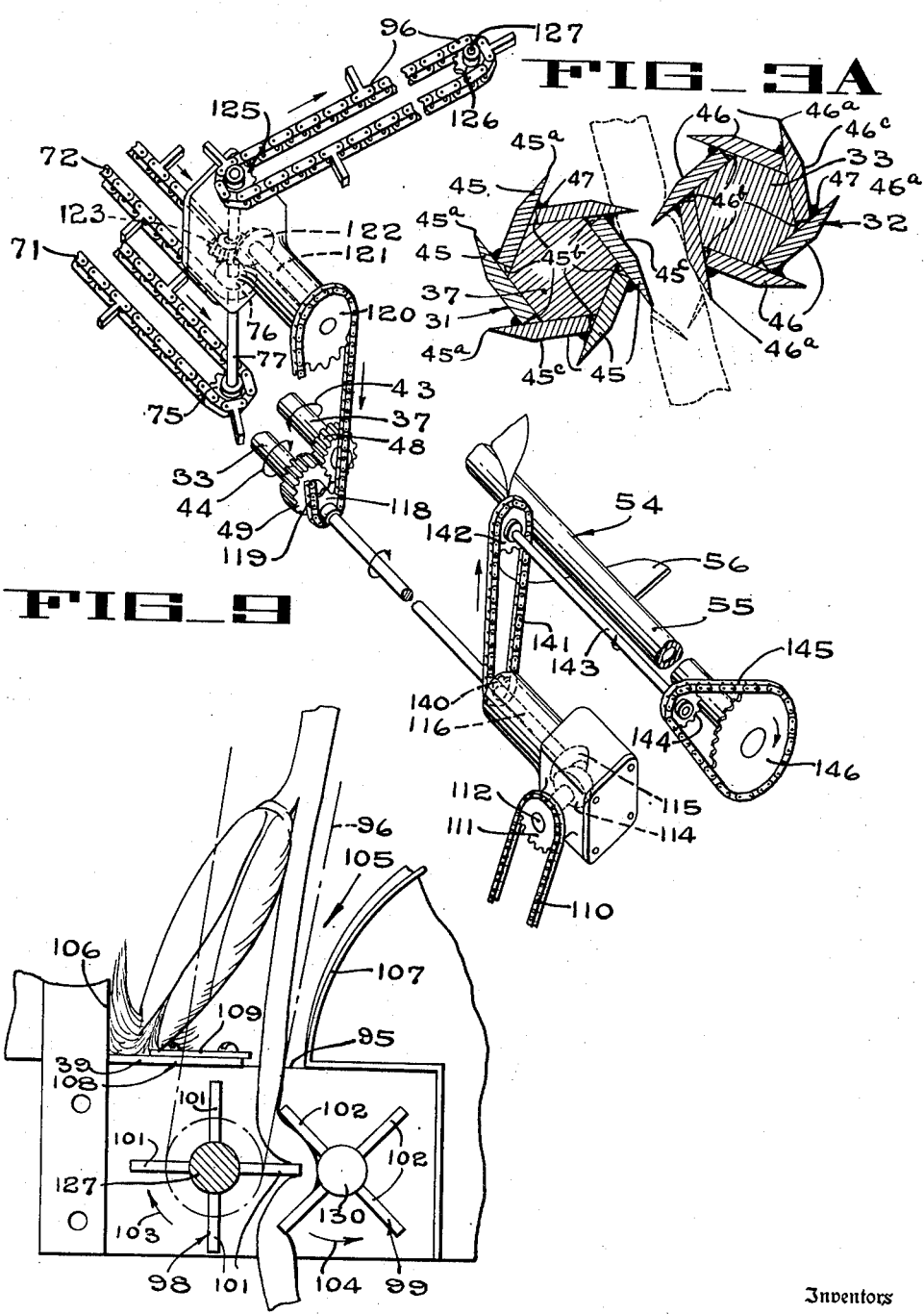

April 27, 1954
E. J. SCHAAF ET AL
2,676,450
CORN HARVESTING MACHINE
Filed Jan. 4, 1950
5 Sheets-Sheet 5
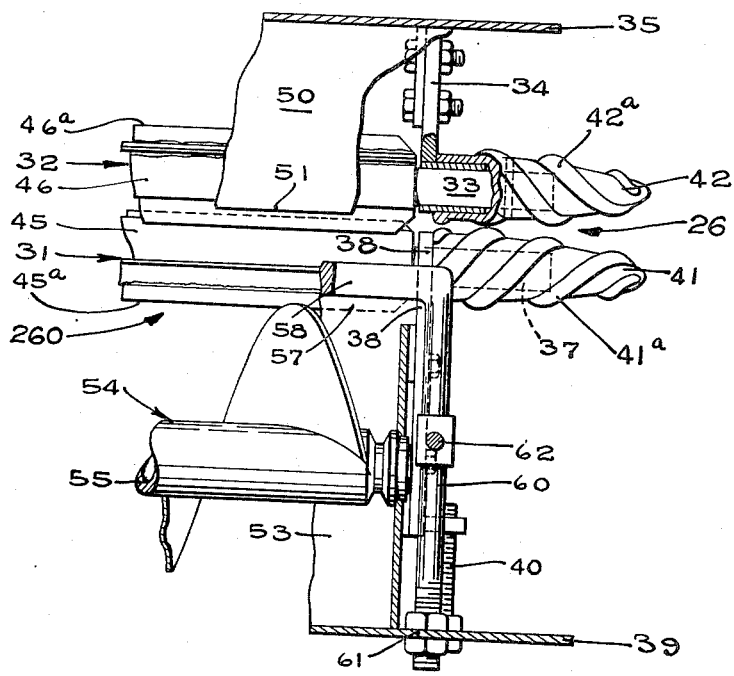
FIG_6
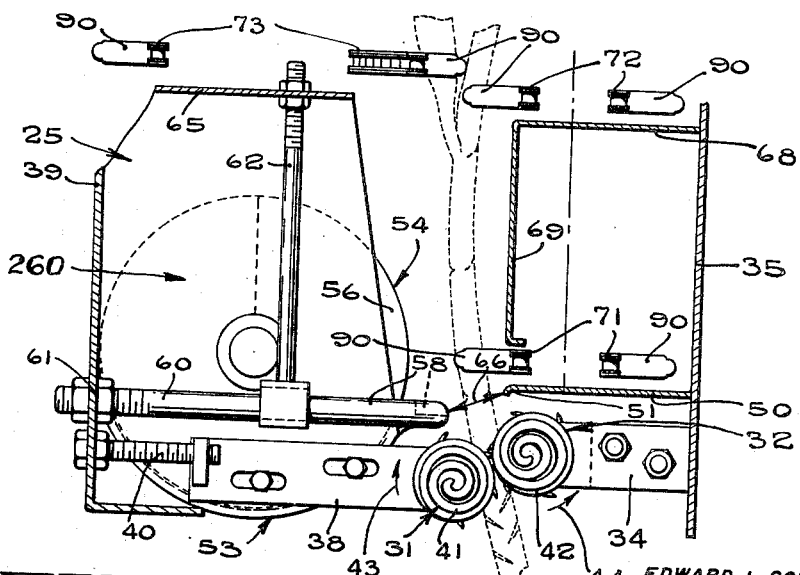
FIG_5
Inventors
EDWARD J. SCHAAF
EDWIN F. GREEDY
By Hans G. Hoffmeister
Attorney Patented Apr. 27, 1954

2,676,450

UNITED STATES PATENT OFFICE 2,676,450

CORN HARVESTING MACHINE

Edward J. Schaaf and Edwin F. Greedy, Hoopeston, Ill., assignors to Food Machinery and Chemical Corporation, San Jose, Calif., a corporation of Delaware Application January 4, 1950, Serial No. 136,678

10 Claims. (Cl. 56—66)

The present invention relates to corn-harvesting machines of the type that form an attachment for tractors. More particularly the present invention relates to corn-harvesting machines, of the type referred to, that operate on rows of corn and are adapted to sever the ears from the stalks and deliver them into suitable ear-collecting vessels.

It is an object of the present invention to provide a corn-harvesting machine of the type referred to, which is dependable in operation; i. e., which will gather practically all the corn ears from the stalks that it encounters during practical use.

Another object is to provide a corn-harvesting machine, of the type referred to, that will not bruise, cut or otherwise injure the corn ears.

It is still another object to provide a corn-harvesting machine that is capable of handling rows of corn stalks of varying density and height without congestion or other types of failures that may necessitate interruption in the performance of the machine for the purpose of reconditioning.

An additional object is to provide a corn-harvesting machine of the type having means for conveying the gathered corn ears to a trailing ear-collecting vessel, wherein means are provided to prevent accidentally gathered stalks or stalk sections from jamming said ear-conveying means.

Furthermore, it is an object to provide a corn-harvesting machine which is adapted to deliver the gathered ears to an ear-collecting vessel but will eject corn stalks which may have accidentally been gathered by the machine, before they reach said ear-collecting vessel.

Moreover, it is an object to provide a corn-harvesting machine, of the type referred to, which ejects accidentally gathered corn stalks or sections thereof, but will retain practically all of the ears that may still be attached to said stalks so that loss of corn ears is held at a minimum.

These and other objects of our invention will be apparent from the following description of the accompanying drawings which illustrate a preferred embodiment thereof and wherein:

Figure 1 is a plan view with parts broken away and shown in section of a corn-harvesting machine, constructed in accordance with our invention, provided with a picker head which comprises two symmetrically arranged corn-processing channels, Figure 2 is an enlarged plan view of the right half of the picker head with part of its covers removed, Figure 3 is a vertical section on an enlarged scale through the right half of the picker head taken along line 3—3 of Figure 2 and viewed in the direction of the arrows associated with said line, Figure 3a is an enlarged view of the rotors 31 and 32 shown in Figure 3, Figure 4 is a horizontal section with parts broken away through the right half of the picker head taken along line 4—4 of Figure 3, Figure 5 is another vertical section on an enlarged scale through the right half of the picker head taken along line 5—5 of Figure 2, Figure 6 is a fragmentary plan view on an enlarged scale illustrating the front end of the processing mechanisms comprised in the right half of the picker head, Figure 7 is an enlarged fragmentary side elevation of the picker head viewed in the direction of the arrows 7—7 of Figures 1 and 2 and illustrating the stalk-ejector mechanism provided in the right half of the picker head, Figure 8 is an enlarged horizontal section through said stalk ejector mechanism taken along line 8—8 of Figure 7, and Figure 9 is a fragmentary perspective of the power train for the various mechanisms comprised in the right half of the picker head.

Having first reference to Figure 1, a corn-harvesting machine constructed in accordance with our invention and collectively identified by the reference numeral 15, is suitably mounted upon a tractor 16 that comprises a pair of cambered front wheels 17 and 18 and a pair of rear wheels 19 and 20 upon which is supported the motor 21 with the steering wheel 22 and the driver's seat 23. The picker head 25 of said corn-harvesting machine 15 comprises parallel processing channels 26 and 27 located respectively and symmetrically at each side of the tractor motor 21. The front end of the picker head 25 is formed by a centrally positioned gathering snout 28 that is flanked by two laterally positioned gathering snouts 29 and 30. The converging surfaces of said snouts are arranged to guide the stalks of two adjacent rows of corn into the processing channels 26 and 27 as the tractor 16 moves the machine across a corn field. Associated with said channels 26 and 27 are processing mechanisms 260 and 270, respectively, which are of symmetrically identical construction and operate in an identical manner to grip the corn stalks, sever the ears from the stalks, deliver the severed ears to a common ear-collecting vessel and dispose of the stalks. Accordingly, only the processing mechanism 260 of the processing channel 26 will be described in detail hereinafter to explain the invention and the manner in which it operates.

Arranged within and extending longitudinally of channel 26, near the bottom end thereof, are two parallel rotors 31 and 32. The right one 32 of said rotors (as viewed from the front of the machine) comprises a shaft 33 the front end of which is rotatably supported by an arm 34 from a longitudinally extending vertical partition 35 located to the right of said shaft (Figures 5 and 6), while its rear end protrudes through and is suitably journalled in a transverse wall or partition 36 located rearwardly of the processing channel 26 (Figure 4). The left one 31 of said rotors comprises a shaft 37 the rear end of which protrudes through and is suitable journalled in the transverse partition 36 while its front end is rotatably mounted in a transverse plate 38 that is adjustably supported from the right side wall 39 of the picker head 25 by means of a screw member 40. Fitted upon the front ends of said shafts are conical noses 41 and 42 provided with oppositely threaded spiral welts 41a and 42a that are arranged to draw stalks of corn into the space between the rotors 31 and 32 whenever said rotors are turned in the direction indicated by the arrows 43 and 44 in Figures 5 and 9 with their adjacent segments moving downwardly. Each of the shafts 33 and 37 carried six elongated blades 45 and 46, respectively, which are staggered above one another in such a manner that their cutting edges 45a and 46a project above the rear edges 45b and 46b of the directly preceding blades in the above defined direction of rotation of the rotors 31 and 32, as shown in Figures 3 and 3a. Said blades 45 and 46 may be soldered to one another, as indicated at 47 in Figure 3a, so as to form integral sleeve-like structures that may readily be removed from their respective shafts whenever it is necessary to recondition or replace the blades.

Intermeshing gears 48 and 49 are firmly secured to the rear ends of the shafts 33 and 37, as shown in Figures 4 and 9, so that the rotors 31 and 32 may be turned in unison in opposite directions, as indicated by the previously mentioned arrows 43 and 44; and in the preferred embodiment of the invention illustrated in the accompanying drawings said rotors 31 and 32 are operationally aligned with one another in such a manner that their respective cutting edges 45a and 46a interlap. Thus, whenever the harvesting machine is moved over and along a row of corn and the spiral noses 41 and 42 draw the stalks of corn into the spaces between the rotating blades 45 and 46, the cutting edges 45a and 46a of said blades slice successively from opposite sides into said stalks, with the flat outer surfaces 46c and 45c of said blades acting as supports whenever the edge of an oppositely positioned blade slices into the stalk from the opposite side. In this manner the rotors 31 and 32 pull the stalks downwardly through the space between the blades 45 and 46 until the stem or shank of a corn ear comes into the range of the rotating blades and is severed by said blades.

To prevent the accumulation of stalk fragments, weeds, or like matter at the edges of the blades 45 and 46 during practical operation of the rotors 31 and 32, suitable scraper bars 31a and 32a may be associated with said rotors, as indicated in Figure 3.

Referring again to Figure 3, it should be noted that the rotors 31 and 32 are spaced sufficiently far apart to prevent the cutting edges 45a and 46a from severing the stalks completely, for if the action of the cutting edges were such as to sever intermediate stalks completely, the upper portions of the stalks would simply be chopped off and the rotors 31, 32 would lose control of the stalks. As a result thereof the upper stalk portions would remain above and fall lengthwise onto the rotors which is liable to jam the rotors and bruise or otherwise injure the corn ears that grow on said upper stalk portions. By spacing the rotors 31 and 32 sufficiently apart to avoid complete severing of the stalks and by providing each of said rotors with as many as six successive blades that bite in rapid succession into the stalks from opposite sides thereof, the rotory cutters 31, 32 retain a continuous and uniform grip upon the stalks and pull them fully down to the ground while making numerous overlapping incisions into said stalks over their total length (Figure 3) which weaken the structure of said stalks sufficiently to cause them to break into pieces as the machine advances across the field; and the shanks of all the corn ears, no matter how high they may grow on said stalks, are dependably drawn into the range of action and severed by the blades of said rotary cutters 31 and 32.

Suitably supported from the aforementioned partition 35, directly above the range of action of the right one 32 of the rotary cutters, is a horizontal deck plate 50 the inner edge of which is bent slightly in downward direction to form a rounded rim 51 that extends above and parallel to said rotary cutter 32 over the full length thereof (Figures 3 and 4). Arranged adjacently to the left one 31 of said rotary cutters is a trough 53 of semi-circular contour that forms part of a helical conveyor 54 which extends all the way from the front to the rear end of the corn-harvesting machine (Figure 1) and comprises a longitudinal shaft 55 which carries a helical conveyor fin 56. The trough 53 has an inwardly directed lip 57 that extends parallel to and is situated slightly above the range of action of the rotary cutter 31, as best shown in Figure 3, and disposed directly above and parallel to said lip is a bar 58, which jointly with the rounded rim 51 form a corn stalk guide channel 66 in a manner now to be described. The rear end of said bar 58 is adjustably anchored in an aperture 59 provided in said lip 57 directly behind the rear end of the rotor blades, while its front end Figure 6) is bent outwardly at right angles to form a transversely extending arm 60 that is adjustably mounted in the right side wall 39 of the machine, as shown at 61, so that the position of said bar transversely of the processing channel 26 may be varied if desired. In addition the bent front portion 60 of said bar 58 may suitably be connected (Figures 5 and 6) to a vertical screw member 62 that is adjustably held in a horizontal deck plate 65 which is supported from the aforementioned side wall 39 of the machine a suitable distance above the helical conveyor 54. By means of the described members 60 and 62 the gap 66 (Figure 5) between the bar 58 and the inner rim 51 of the aforementioned deck plate 50 may be adjusted depending upon the average diametrical width of the ear butts of the particular type of corn to be harvested by the machine of the invention so as to maintain the corn ears above the rotary cutters 31, 32. With the gap 66 properly adjusted, most corn ears are held out of the range of action of said rotary cutters 31, 32 as said cutters pull the stalks to the ground in the manner previously described; and when a corn ear comes against and is retained by the bar 58 and the rim 51 while the cutters 31, 32 continue to pull the stalk in downward direction, the shank of the ear is stretched so that it will readily be cut by one of the blades of said rotary cutters 31, 32.

All ears attached to the stalk at the side of the conveyor trough 53 will naturally drop into said trough wherein the conveyor 54 delivers them to the rear end of the machine. Normally, however, the corn ears grow from all points of the stalk circumference and to make sure that all ears, no matter where they grow on the stalk, may dependably fall into the aforementioned trough 53, another horizontal deck plate 68 is supported from the right partition 35 a suitable distance above the previously mentioned deck plate 50. Above the rim 51 of said lower deck plate 50 the deck plate 68 is bent downwardly to form a vertical deflector wall 69, and whenever a stalk of corn passes into the processing channel 26, said deflector wall 69 is effective to twist corn ears growing at all sides other than above the trough 53 in the direction of the trough so that they drop into said trough whenever their shanks reach the range of action of and are severed by one of the rotary cutters 31, 32. The effect of the deflector wall 69 may be supported by mounting the right one 32 of the rotary cutters somewhat higher than the left cutter 31, which tends to tilt the stalks in the direction of the trough 53, as illustrated in phantom lines in Figures 3 and 5.

In order that the stalks delivered into the processing channel 26 may arrive in upright position and may remain in such a position when they are processed in the above described manner by the rotary cutters of the machine while the machine advances along the rows of corn, two vertically spaced, lower and upper gathering chains 71 and 72 may be arranged to operate along one side of said channel in substantially coextensive relation and a third gathering chain 73 may be arranged to operate along the opposite side thereof in substantially the horizontal plane of the upper gathering chain 72. Having reference to Figures 2, 3, 4 and 5, the lower and upper gathering chains 71 and 72 are trained around sprockets 75 and 76, respectively, that are firmly mounted upon a common vertically positioned shaft 77 which is suitably journalled in the machine frame at a point rearwardly of the blades of the rotary cutters 31, 32. Said chains 71, 72 extend directly above the aforementioned lower and upper deck plates 50 and 68, respectively, with their front ends trained around suitable idler sprockets 78 and 79 that may be adjustably mounted upon said deck plates 50 and 68, as shown at 81 and 82 in Figures 2 and 4. The third gathering chain 73 is trained around a sprocket 83 (Figures 2 and 3) that is firmly secured to a stub shaft 84 which is mounted upon the previously mentioned deck plate 65 rearwardly of the blades of the rotary cutters 31, 32. The forward end of said gathering chain 73 is trained around an idler sprocket 85 that is adjustably mounted upon the deck plate 65 near the front end of the snout 29, as shown at 86 in Figures 2 and 4, and a skid shoe 87 supported from said deck plate 65 by means of an adjustable slide 88 aligns the inner run of said gathering chain 73 with the inwardly slanting guide wall 89 of the snout 29 and the longitudinally extending inner edge of the deck plate 65, as best shown in Figure 4. The gathering chains 71, 72 and 73 may be of conventional construction possessing numerous outwardly projecting lugs 90, arranged at equal intervals along the circumference of said chains and adapted to engage the corn stalks and pull them inwardly toward and through the processing channel 26.

As previously indicated, the helical conveyor 54 transports the ears dropping into the trough 53 to the rear end of the machine where they slide down a short inwardly inclined gravity chute 92 into the lower end of a centrally positioned conveyor 93 (Figure 1) that is swiveled to the rear end of the machine and which is arranged to raise the ears above the walls of a trailing collector truck (not shown). A blower 94 may be mounted above said gravity chute 92 to separate small stalk fragments and like impurities from the ears in the customary manner before they are delivered into the collector truck.

In practical operation corn stalks may accidentally be severed completely and relatively long stalk sections may therefore remain above the rotary cutters 31, 32 and clog the rear end of the processing channel 26 or drop into the trough 53 and jam the helical conveyor 54. Means are therefore provided in accordance with the invention which eject such long stalk sections laterally from the interior of the picker-head so that they cannot interfere with the proper operation of the rotary cutters or stop the flow of the severed ears to the rear of the machine. For this purpose an opening 95 is provided in the aforementioned side wall 39 of the picker-head near the rear end of the processing channel 26 (Figures 2 and 8) and an endless gathering chain 96 is arranged to extend transversely across said processing channel 26 and the conveyor 54 and may, to a limited extent, project through the opening 95. Said gathering chain 96 is operated in such a direction (Figure 9) that its front run drags or bends elongated stalk sections that may accumulate at the rear end of the processing channel 26 or clog the conveyor 54, sideways toward the aforementioned lateral opening 95. Mounted in front of said opening exteriorly of the picker-head are two vertically positioned paddle wheels 98 and 99 (Figures 7 and 8) each of which may have four paddle blades 101 and 102, respectively, that are arranged to interlap. During operation of the machine said paddle wheels are turned continuously in opposition in the directions indicated by the arrows 103 and 104 in Figure 8 and grip the ends of stalk sections that may project through the opening 95 and pull such stalk sections positively from the interior of the picker head. The gathering chain 96 is preferably arranged to operate within a converging passage 105 (Figures 2 and 8) that is formed between a transverse partition 106 of the picker head which is positioned rearwardly of said chain 96 and a guide panel 107 that is positioned in front of the chain 96 and extends in an arc from a point above the shaft 55 of the helical conveyor 54 to the forward edge of the opening 95 in the previously described side wall 39 of the picker head (Figures 2 and 8). To retain ears that may still be attached to the stalk sections, the end of said converging passage 105 is partially blocked by said side wall 39 of the picker head, as indicated at 108 in Figures 2 and 8, so that the opening 95 is only wide enough to readily pass stalks but is sufficiently narrow to impede the passage of corn ears. Thus, ears attached to stalk sections that are dragged through the converging passage 105 by the action of gathering chain 96, will in most instances strike against the wall portion 108 that partially blocks the end of the passage 105, as shown in Figure 8, and will be snapped from the stalks as the paddle wheels 98 and 99 pull the stalks positively from the interior of said passage 105. Even if corn ears should happen to arrive properly centered with the opening 95, the small dimensions of said opening will prevent most of such ears from passing to the outside. Hence, in practice only a very small number of relatively small corn ears will actually escape from the picker head with the ejected stalk sections, while by far the greater part of them is snapped from the stalk sections and drops into the conveyor 54 underneath to be carried to the rear end of the machine and delivered into the ear collector truck in the manner previously described. To adapt the described ejector mechanism for operation with different types of corn, means may be provided to adjust the width of opening 95, such as the plate 109 that is adjustably secured to the wall portion 108, as shown in Figure 8.

All the moving elements of the described corn-harvesting mechanism may conveniently be driven from a common source of power which will usually be the tractor motor 21. Having reference to Figure 9, a sprocket chain 110 transmits the rotary motion of a power take-off shaft (not shown) to a sprocket 111 that is keyed to a transverse shaft 112. Said transverse shaft 112 carries a bevel gear 114 which meshes with another bevel gear 115 that is keyed upon a longitudinally extending shaft 116 which is suitably coupled to the previously mentioned shaft 33 of rotor 32 and drives said rotor in the direction of the arrow 44. Keyed to the end of said shaft 33 is the aforementioned gear 49 that meshes with the gear 48 which is keyed to the end of the aforementioned shaft 37 of rotor 31. Thus, whenever the rotor 32 is driven in the direction of the arrow 44, the rotor 31 is driven at equal speed in the opposite direction, as previously explained.

Keyed to the aforementioned longitudinal shaft 116 is a sprocket 118 and a sprocket chain 119 trained around said sprocket 118 transmits the rotary motion of said shaft to another sprocket 120 that is keyed to another longitudinally extending shaft 121. Firmly mounted upon said shaft 121 is a bevel gear 122 which meshes with another bevel gear 123 that is keyed to the vertical shaft 77 which carries the sprockets 75 and 76 that drive the gathering chains 71 and 72, as previously explained. Firmly secured to the upper end of the vertical shaft 77 is a third sprocket 125 which drives the transverse gathering chain 96 of the stalk ejector mechanism. The outer end of said transverse gathering chain is trained around a sprocket 126 that is keyed to the upper end of a vertical shaft 127 which is rotatably supported from the side wall 39 of the picker head in front of the ejector opening 95 and drives the paddle wheel 98 (Figures 7 and 8). Secured to the bottom end of said shaft 127 is a gear 128 which meshes with another gear 129 of identical construction that is keyed to another vertical shaft 130 which drives the paddle wheel 99. Likewise secured to said shaft 130 is a sprocket 131 which drives a sprocket chain 132 that is trained around another sprocket 133 which is keyed to the lower end of a vertical idler shaft 134. Said idler shaft is rotatably supported from the side wall 39 of the picker head and carries on its upper end another sprocket 135 which drives a sprocket chain 136 that is trained around another sprocket 137 (Figure 3). Said sprocket 137 is integral with the vertical shaft 84 which carries the sprocket 83 that drives the gathering chain 73.

Reverting to shaft 116 (Figure 9), said shaft carries a sprocket 140 which drives a sprocket chain 141 that is trained around another sprocket 142 keyed to an auxiliary shaft 143. Firmly mounted upon the rear end of said auxiliary shaft 143 is a small sprocket 144 which is operatively connected by means of a sprocket chain 145 to a large sprocket 146 that is keyed to the rear end of the shaft 55 which drives the helical conveyor 54, as previously explained. By properly proportioning the relative sizes of the described gears and sprockets, the rotary cutters 31, 32, the gathering chains 71, 72 and 73, the helical conveyor 54 and the paddle wheels 98 and 99 may be made to operate at their proper speeds.

While the present invention has been described with the aid of an exemplary embodiment thereof it will be understood that it is not limited to the specific constructional details shown and described that may be departed from without departing from the scope and the spirit of our invention.

We claim:

1. A mobile corn harvesting machine for cutting ears of corn from the stalks in the fields, comprising a vehicle frame, a pair of substantially horizontally positioned rotors journalled on said frame, means supported upon said frame and operably connected with said rotors for turning same in opposite directions with their adjacent segments moving downwardly, a plurality of blades mounted upon said rotors with the leading edge of each blade arranged to project beyond the trailing edge of the directly preceding blade, said rotors being positioned sufficiently close to each other to leave a space between their respective blades less than the diameter of the stalks to be processed so that said projecting blade edges slice laterally into intermediate corn stalks and pull them downwardly between said rotors, and complemental guide members mounted upon said frame above each of said rotors in spaced parallel relation to form a guide channel wide enough to freely receive stalks yet sufficiently narrow to maintain corn ears above said complemental guide members.

2. A machine as specified in claim 1 comprising means for adjusting the distance between said rotors.

3. A machine as specified in claim 1 comprising means for adjusting the distance between said complemental guide members to vary the width of said guide channel.

4. A machine as specified in claim 1 wherein each of said rotors carries six of said blades.

5. A machine as specified in claim 1 comprising scrapers associated with each of said rotors.

6. A mobile corn harvesting machine for cutting ears of corn from the stalks in the field comprising a vehicle frame, a pair of elongated parallel rotors journalled on said frame, means supported upon said frame and operably connected with said rotors for turning same in opposite directions, a plurality of blades mounted upon said rotors with the leading edge of each of said blades arranged to project beyond the trailing edge of the directly preceding blade in the direction of movement of said rotors, said rotors being operationally aligned in such a manner that said projecting blade edges interlap, and spaced from one another sufficiently far to avoid complete severing of intermediate corn stalks by said projecting blade edges in order that said projecting edges may slice into said stalks and pull them downwardly between said rotors, and complemental guide members mounted upon said frame above each of said rotors to form a guide channel wide enough to freely receive corn stalks yet sufficiently narrow to block downward passage of corn ears.

7. A mobile corn harvesting machine for cutting ears of corn from the stalks in the field comprising a vehicle frame, a pair of substantially horizontally positioned parallel rotors journalled on said frame at different elevations, means supported upon said frame and operably connected with said rotors for turning same in opposite directions, a plurality of blades mounted upon said rotors with the leading edge of each of said blades arranged to project beyond the trailing edge of the directly preceding blade in the direction of movement of said rotors, said rotors being operationally aligned in such a manner that said projecting blade edges interlap and spaced from one another sufficiently far to avoid complete severing of intermediate corn stalks by said projecting blade edges in order that said projecting blade edges may slice into said stalks and pull them downwardly between said rotors, complemental guide members mounted upon said frame above each of said rotors to form a guide channel wide enough to freely receive corn stalks yet sufficiently narrow to block downward passage of corn ears, and a conveyor mechanism operably supported upon said frame in adjacent relation to the lower one of said rotors.

8. A mobile corn harvesting machine for cutting ears of corn from the stalks in the field, comprising a vehicle frame, a pair of substantially horizontally positioned parallel rotors journalled on said frame, means supported upon said frame and operably connected with said rotors for turning same in opposition with their adjacent segments moving in downward direction, a plurality of blades mounted upon said rotors with the leading edge of each of said blades arranged to project tangentially of its respective rotor above and beyond the trailing edge of the directly preceding blade, said rotors being positioned sufficiently close to each other to leave a space between their respective blades less than the diameter of the stalks to be processed in order that said projecting blade edges may slice laterally into intermediate corn stalks and pull them downwardly between said rotors, complemental guide members mounted upon said frame above each of said rotors in spaced parallel relation to form a guide channel wide enough to freely receive stalks yet sufficiently narrow to maintain corn ears above said complemental guide members, a conveyor mechanism operably supported upon said frame in adjacent relation to one of said rotors, and a vertical deflecting wall mounted upon said frame above the other one of said rotors.

9. A mobile corn harvesting machine for cutting ears of corn from the stalks in the field, comprising a vehicle frame, a pair of elongated and substantially horizontally positioned parallel rotors journalled upon said frame, means supported upon said frame and operably connected with said rotors for turning same in opposition with their adjacent segments moving in downward direction, a plurality of blades mounted upon said rotors with the leading edge of each of said blades arranged to project tangentially of said rotors above and beyond the trailing edge of the directly preceding blades, said rotors being positioned sufficiently close to each other to leave a space between their respective blades less than the diameter of the stalks to be processed in order that said projecting blade edges may slice laterally into intermediately positioned corn stalks and pull them downwardly between said rotors, complemental guide members mounted upon said frame above each of said rotors in spaced parallel relation to form a guide channel wide enough to freely receive stalks yet sufficiently narrow to maintain corn ears above said complemental guide members, a conveyor mechanism operably supported upon said frame in adjacent relation to one of said rotors, a vertical deflecting wall mounted upon said frame above and in vertical alignment with the complemental guide member above the other one of said rotors, and corn stalk gathering chains operably supported upon said frame to operate above said rotors at each side thereof.

10. A mobile corn harvesting machine for cutting ears of corn from the stalks in the field, comprising a vehicle frame, a pair of elongated and substantially horizontally positioned parallel rotors journalled on said frame, means mounted upon said frame and operably connected with said rotors for turning same in opposition with their adjacent segments moving in downward direction, a plurality of blades mounted upon said rotors with the leading edge of each of said blades arranged to project tangentially of said rotors above and beyond the trailing edge of the directly preceding blades, said rotors being positioned sufficiently close to each other to leave a space between their respective blades less than the diameter of the stalks to be processed in order that said projecting blade edges may slice laterally into corn stalks and pull them downwardly between said rotors, complemental guide members mounted upon said frame above each of said rotors in spaced parallel relation to form a guide channel wide enough to freely receive stalks yet sufficiently narrow to maintain corn ears above said complemental guide members, a conveyor mechanism operably supported upon said frame in adjacent relation to one of said rotors, a vertical deflector wall mounted on said frame above and in vertical alignment with the complemental guide member above the other one of said rotors, a lower corn stalk gathering chain operably supported upon said frame to operate between said last mentioned complemental guide member and said deflector wall, an upper corn stalk gathering chain operably supported upon said frame to operate above said deflector wall in vertically aligned relation to said lower corn stalk gathering chain, a third corn stalk gathering chain operably supported upon said frame to operate above said conveyor in substantially opposed relation to said upper corn stalk gathering chain, and means carried by said frame for actuating said gathering chains in unison.

References Cited in the file of this patent
UNITED STATES PATENTS

| Number | Name | Date |
| --- | --- | --- |
| 880,139 | Hahn | Feb. 25, 1908 |
| 1,821,985 | Peterson | Sept. 8, 1931 |
| 2,223,704 | Powell | Dec. 3, 1940 |
| 2,434,124 | Schaff et al. | Jan. 6, 1948 |
| 2,542,646 | Fergason | Feb. 20, 1951 |
| 2,571,865 | Greedy et al. | Oct. 16, 1951 |